United States Patent
Huang et al.

(10) Patent No.: US 7,843,838 B1
(45) Date of Patent: Nov. 30, 2010

(54) COMMUNICATION NETWORK ROUTE TRACING

(75) Inventors: Renxiang Huang, Sunnyvale, CA (US);
Ian M. White, San Francisco, CA (US);
James J. Pan, Cupertino, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1022 days.

(21) Appl. No.: 11/095,833

(22) Filed: Mar. 31, 2005

(51) Int. Cl.
*H04L 12/26* (2006.01)

(52) U.S. Cl. ............... 370/241.1; 370/255; 709/224; 398/33; 398/45

(58) Field of Classification Search .......... 370/217, 370/236, 539; 398/33, 5, 25
See application file for complete search history.

(56) References Cited

U.S. PATENT DOCUMENTS

| | | | |
|---|---|---|---|
| 6,026,073 A * | 2/2000 | Brown et al. | 370/216 |
| 6,078,596 A * | 6/2000 | Wellbrock | 370/352 |
| 6,094,682 A * | 7/2000 | Nagasawa | 709/224 |
| 6,239,699 B1* | 5/2001 | Ronnen | 340/517 |
| 6,377,543 B1* | 4/2002 | Grover et al. | 370/255 |
| 6,483,809 B2* | 11/2002 | Shimada | 370/241.1 |
| 6,763,190 B2* | 7/2004 | Agrawal et al. | 398/5 |
| 7,158,721 B2* | 1/2007 | Mantin et al. | 398/25 |
| 2001/0041538 A1* | 11/2001 | Schmitt et al. | 455/67.4 |
| 2002/0080829 A1* | 6/2002 | Ofek et al. | 370/539 |
| 2002/0191241 A1* | 12/2002 | Emery et al. | 359/109 |
| 2004/0008988 A1* | 1/2004 | Gerstal et al. | 398/45 |
| 2004/0120710 A1* | 6/2004 | Seddigh et al. | 398/33 |
| 2005/0086555 A1* | 4/2005 | Langridge | 714/4 |
| 2005/0249119 A1* | 11/2005 | Elie-Dit-Cosaque et al. | 370/236 |
| 2005/0281192 A1* | 12/2005 | Nadeau et al. | 370/217 |
| 2006/0031573 A1* | 2/2006 | Feutz et al. | 709/238 |
| 2007/0274227 A1* | 11/2007 | Rauscher et al. | 370/252 |

OTHER PUBLICATIONS

"PM5380 S/UNI 8X155 8 Channel 155Mbit/s ATM and Packet over Sonet/SDH Physical Layer Device" obtained Feb. 15, 2005, http://www.pmc-sierra.com/products/details/pm5380/ pp. 1-5.
"8-Channel OC-3c ATM and POS Physical Layer Device" PMC (PMC-Sierra, Inc. 2002) PM5380 S/UNI 8x155 (2 sheets).
"uPD98414 2.4 Gbps ATM Sonet Framer" NEC Document # S14306EUTVOPBOO, www.necel.com.

* cited by examiner

*Primary Examiner*—Kwang B Yao
*Assistant Examiner*—Jeffrey M Rutkowski (57) ABSTRACT

A method for tracing a communication route through a network coupling a first device with a second device is provided. A first signal is transferred from the first device to the second device to cause a plurality of intermediate devices to report first information concerning the first signal. The first information is processed to identify the intermediate devices as defining the communication route. The intermediate devices are configured so that a second signal, when transferred from the first device toward the second device, causes a subset of the intermediate devices to report second information concerning the second signal. The second signal is transferred from the first device toward the second device. The second information is processed to identify the subset of the intermediate devices as a portion of a sequence of the intermediate devices defining the communication route.

20 Claims, 6 Drawing Sheets

COMMUNICATION NETWORK ROUTE TRACING

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to communication networks, and more particularly to identification of communication routes in communication networks.

2. Description of the Prior Art

Communication networks, such as local area networks (LANs), wide area networks (WANs), virtual private networks (VPNs), and myriad others, typically provide extremely useful connectivity among large numbers of computers, personal digital assistants (PDAs), mobile communications terminals, and other devices for informational interchange. Due to the often complex topology required of a network to provide this connectivity, many possible physical paths or routes for informational transfer between any two network devices may exist. Further, the decision as to which particular path is employed for communication between a source and destination in the network may be distributed among many routers, which are devices employed to forward packets of data from a source to a destination through or between networks. Thus, determining the particular route employed for information transfer between two specific devices is often a nontrivial task.

Identification of a particular communication route between a source and a destination within one or more networks provides significant advantages in terms of facilitating network maintenance. More specifically, ascertaining the various routes employed by a network to connect any two communicating devices provides an indication of the overall topology of the network. In turn, this information allows faster identification of faulty devices within the network, as well as any "bottlenecks" adversely affecting network performance.

In networks employing Internet Protocol (IP), determining the physical route between a source and a destination is facilitated by way of an IP utility called "traceroute." By sending a series of data packets, traceroute determines the identity of each router through which data is transferred between the source and destination, as well as the sequence or order of the routers encountered by the data. Other network protocols, such as those employed in UNIX- and Windows-based networks, provide similar utilities.

However, tracing a route through a network is complicated by the existence of multi-layer networks, which are networks utilizing two or more different network protocol layers to constitute at least a portion of a network. For example, some IP networks employ one or more optical networks to supply some of the connections between network devices. Such optical networks typically employ a communication protocol other than IP, such as the Synchronous Optical Network (SONET) protocol. However, due to limited interaction between the separate layers of the network, the optical portions of the network are not detected by the IP traceroute utility; only the IP routers are identified. As a result, a particular route through an optical portion of the network between two IP routers, which may constitute a significant portion of the route, typically remains unknown. Thus, opportunities for reconfiguring the optical connections to circumvent failed equipment or enhance performance are not exploited, making the network difficult to support and maintain.

SUMMARY OF THE INVENTION

Embodiments of the invention, described below, provide a method for tracing a communication route through a communication network coupling a first device with a second device. A first signal is transferred from the first device to the second device to cause a plurality of intermediate devices to report first information concerning the first signal. The first information is processed to identify the intermediate devices as defining the communication route. The intermediate devices are configured so that a second signal, when transferred from the first device toward the second device, causes a subset of the intermediate devices to report second information concerning the second signal. The second information is processed to identify the subset of the intermediate devices as a portion of a sequence of the intermediate devices defining the communication route.

In one embodiment, the intermediate devices are reconfigured, and the second signal is retransferred from the first device toward the second device, repeatedly until the sequence of the intermediate devices defining the communication route is determined.

Additional embodiments and advantages of the present invention will be realized by those skilled in the art upon perusal of the following detailed description, taken in conjunction with the accompanying drawings.

DETAILED DESCRIPTION OF THE INVENTION

Figure 1:
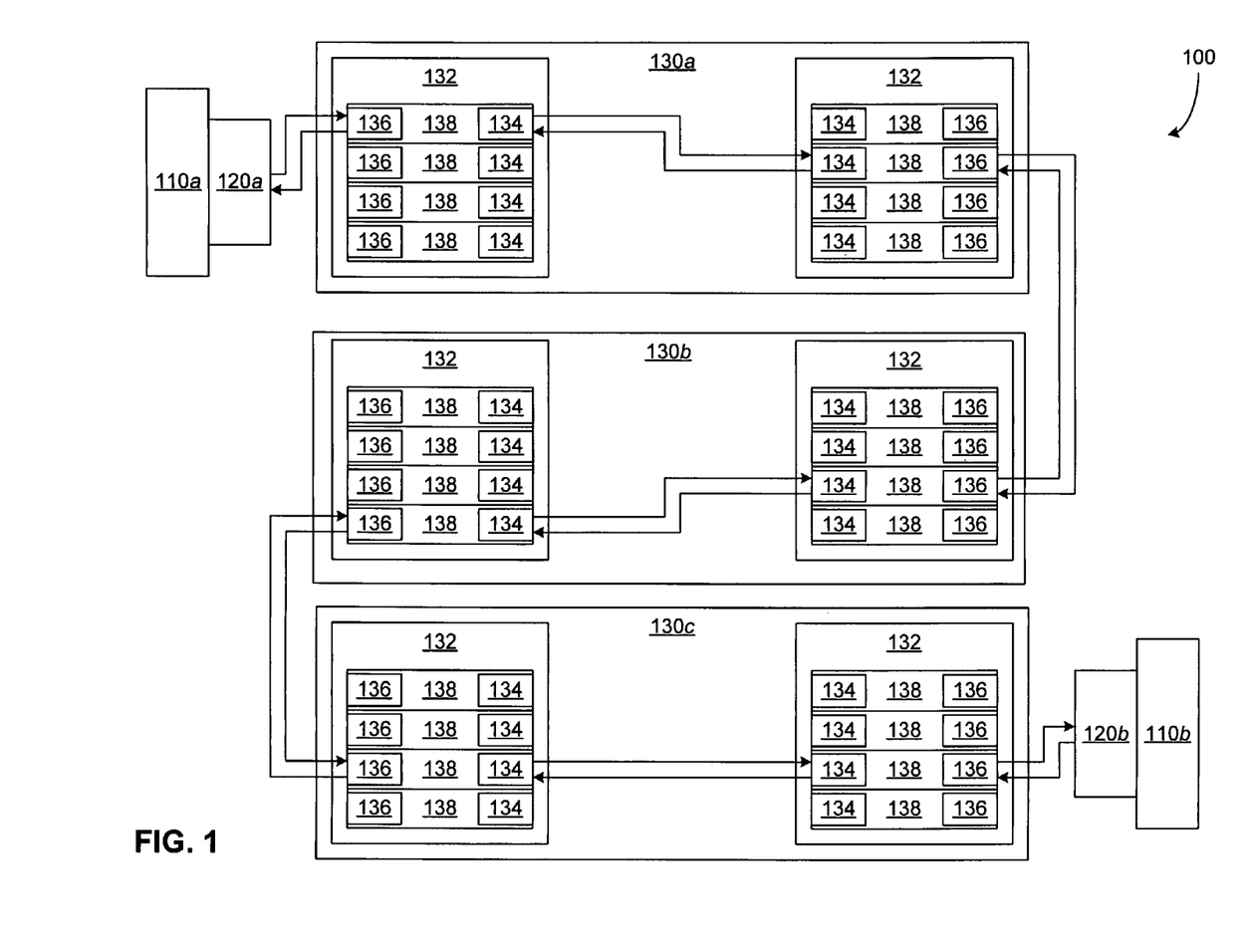
FIG. 1 is a block diagram of an example of an IP-over-optical link upon which an embodiment of the invention may operate.

FIG. 1 is a block diagram of an example of a simplified Internet Protocol (IP) over Synchronous Optical Network (SONET) link 100 of a multi-layer network. This particular link 100 is employed in discussing various embodiments of the invention. The link 100 represents the communication route employed to carry data packets between a first IP router 110*a* and a second IP router 110*b*, as described in greater detail below. Not shown in FIG. 1 are other portions of the multi-layer network that may also be employed in alternative situations to couple the routers 110*a*, 110*b*.

In the particular example of FIG. 1, the link 100 includes the first router 110a and the second router 110b for transmitting data between various communication devices, such as computers, PDAs and the like. The routers 110a, 110b represent first and second devices of the network between which data packets are transferred.

Coupling the first router 110a and the second router 110b are multiple wavelength division multiplexing (WDM) systems 130a, 130b and 130c, coupled back-to-back to form a path. Each WDM system 130a-130c employs wavelength division multiplexing to provide multiple optical communication channels over a single optical connection. Any number of WDM systems 130a-130c may be employed to couple the first router 110a and the second router 110b together in alternative embodiments of the invention so that packets of data may be transferred from the first router 110a to the second router 110b, and vice-versa. In another embodiment, other optical communication mechanisms, such as dense wavelength division multiplexing (DWDM) systems, may be employed to similar end. In a further embodiment, communication mechanisms other than optical communication links may be utilized to couple the first and second routers 110a, 110b.

Between each router and its closest WDM system, such as the first router 110a and the first WDM system 130a, a "packet-over-SONET" (POS) interface 120 translates data between the electrical signals of the router 110 and the optical signals of the WDM system 130. In FIG. 1, a POS interface 120a resides between the first router 110a and the first WDM system 130a, while a second POS interface 120b resides between the second router 110b and the last WDM system 130c. Each POS interface 120 also performs the required data conversion between IP packets and SONET frames. The POS interface 120 may reside within the router 110, or may be located externally thereto.

In FIG. 1, each WDM system 130a-130c contains two WDM terminals 132, each of which contains one or more WDM transceivers 138. Those WDM transceivers 138 which form the route between the routers 110a, 110b act as intermediate devices for transmitting and receiving optical data between the routers 110a, 110b. Each WDM transceiver 138 contains a bidirectional long reach interface 134 and a bidirectional short reach interface 136 for interchange of optical data. The long reach interface 134 couples a transceiver 138 of one WDM terminal 132 to a transceiver 138 of another WDM terminal 132 within a single WDM system 130a-130c, while the short reach interface 136 connects a transceiver 138 of one WDM terminal 132 to a transceiver 138 of another WDM terminal 132 of an adjoining WDM system 130a-130c, or to one of the routers 110a, 110b. In other words, the short reach interfaces 136 are employed to couple WDM systems 130a-130c together, while the long reach interfaces 134 transfer optical signals between the two WDM terminals 132 of the same WDM system 130a-130c.

Although not shown in the particular embodiment of FIG. 1, one or more optical switches may also be employed to connect some portion of the various WDM systems 130a-130c or other network devices together in a variety of configurations to couple two or more routers 110 together optically. Thus, embodiments of the invention, to be described below, may operate on such alternative link configurations and many others without departing from the scope of the invention.

Location and interconnection information describing the identity and order of the WDM systems 130a-130c and their various components comprising the connection between the routers 110a, 110b of the link 100 is often recorded into a facility management system (FMS) associated with the network by way of a manual, and hence error-prone, process. Also, this information is rarely updated to represent changes that have been made in the route, especially those made automatically by the routers 110 in response to detected failure conditions. In addition, if optical switches are employed in the route, changes to the route may be made quickly and easily, thereby rendering the stored connection information essentially obsolete. As a result, a more automated method for determining the route for data packets between the routers 110a, 110b would be beneficial.

Each WDM terminal 132, when employing the SONET protocol, typically reports to a SONET management system (SMS) various error signals or "alarms" to indicate the occurrence of various error or alarm conditions detected at one or more of the WDM transceivers 138 of WDM terminals 132. In one example, if a first WDM transceiver 138 detects an error in a data packet received over a short reach interface 136, the transceiver 138 informs the SMS of the error, and passes the erroneous data packet along without correction by way of its long reach interface 134 to a second WDM transceiver 138. As a consequence, the second WDM transceiver 138 will detect the same error, along with any other errors that were induced in the long reach interface 134. Normally, each WDM transceiver 138 issues a single SONET alarm for one or more error or alarm conditions encountered within a fixed time segment, or "bin," of fifteen minutes in length to reduce the total number of alarms generated by the link 100.

In the case of certain classes of SONET alarms, such as CV (code violation) alarms, ES (errored seconds) alarms and SES (severe errored seconds) alarms, only the first incidence of such an alarm per fifteen-minute bin is reported, while further alarms of the same type are suppressed during the same time period. Generally, CV alarms indicate the presence of parity errors in one or more SONET bytes, while ES and SES alarms indicate the number of one-second intervals containing data or other errors within a particular 15-minute time period. Other SONET alarms, such as the alarm indicating signal (AIS), exhibit different, programmable behavior. For example, each WDM transceiver 138 may be programmed to forward over its associated short reach interface 136 an AIS alarm received over its long reach interface 134. Alternatively, such forwarding may be suppressed. Similarly, AIS alarms received over a short reach interface 136 may be either forwarded over the opposing long reach interface 134, or suppressed. Also, the transceiver 138 may be configured to report or suppress AIS alarms to the SMS.

As part of each alarm, an identification of the transceiver 138 generating the alarm is provided, as well as the WDM terminal 132 upon which the transceiver is installed. In some cases; the transceiver 138 is identified by way of a shelf number and a slot number, indicating the physical location of the transceiver 138 within the WDM terminal 132.

While SONET provides a rather robust and detailed alarm system, correlating these alarms with the alarms of another protocol layer, such as those associated with IP routers, has proven rather difficult, due to the different alarm numbering conventions employed among the various protocols. As a result, identifying which WDM transceivers a particular IP link is employing is problematic. However, using these alarms as signals in a particular manner allows identification and sequencing of the transceivers forming a route, as is described below.

Figure 2:
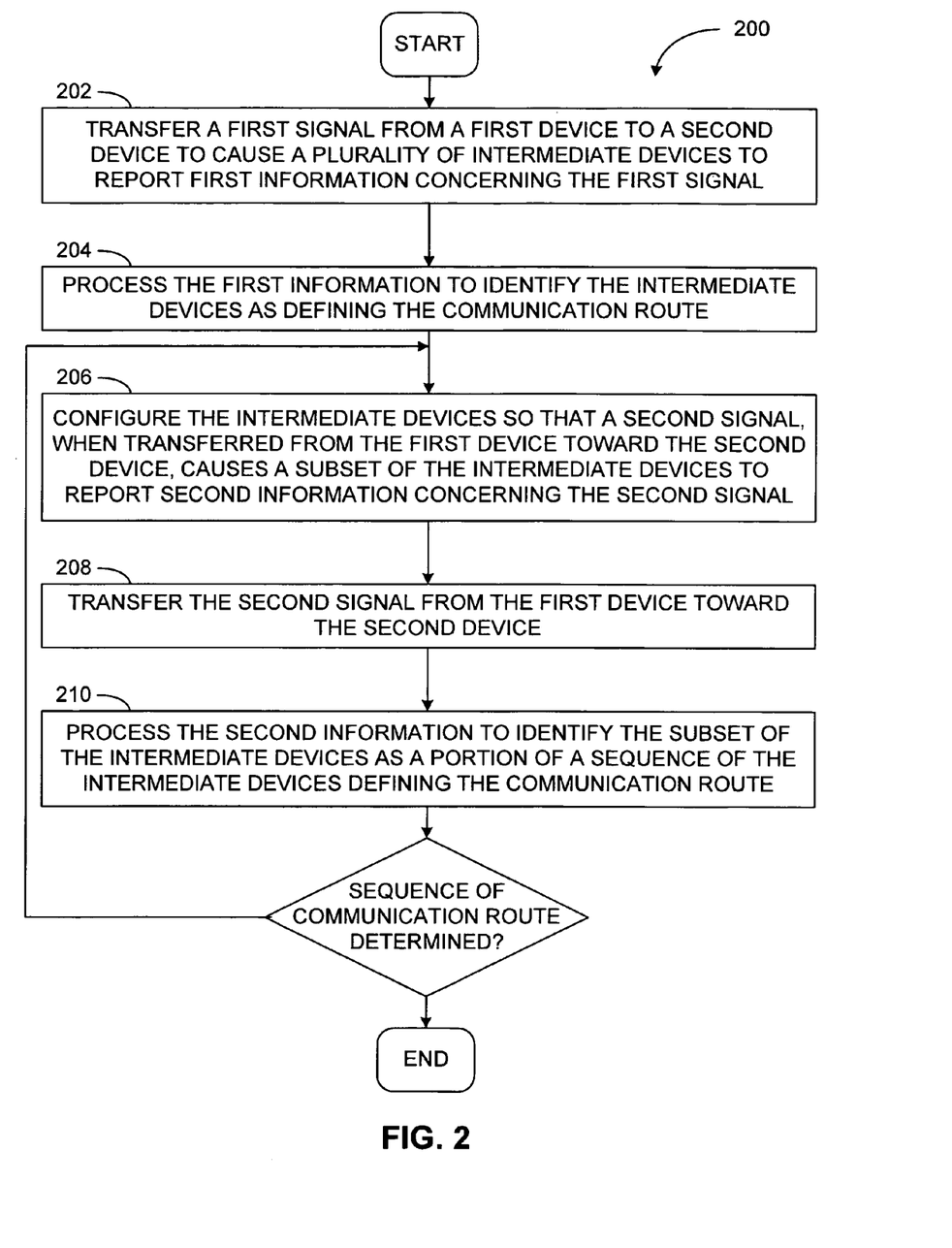
FIG. 2 is a flow chart of a method of a method for tracing a communication route through a communication network coupling a first device with a second device according to an embodiment of the invention.

Generally, embodiments of the present invention provide a method 200 for tracing a communication route through a communication network over which data packets are transferred from a first device to a second device of the network. As shown in FIG. 2, a first signal is transferred from the first device to the second device to cause a plurality of intermediate devices to report first information concerning the first signal (operation 202). The first information is processed to identify the intermediate devices as defining the communication route (operation 204). The intermediate devices are then configured so that a second signal, when sent from the first device toward the second device, causes a subset of the intermediate devices to report second information concerning the second signal (operation 206). The second signal is transferred from the first device toward the second device (operation 208). The second information is then processed to identify the subset of the intermediate devices as a portion of a sequence of the intermediate devices defining the communication route (operation 210). In one embodiment, the intermediate devices are reconfigured (operation 206), the second signal is retransferred (operation 208), and the second information reprocessed (operation 210) repeatedly until the sequence of the intermediate devices defining the communication route is determined. The methods described herein may also be embodied in a digital storage medium for storing a program comprising instructions executable on a processor for implementing the foregoing method.

Figure 3A:
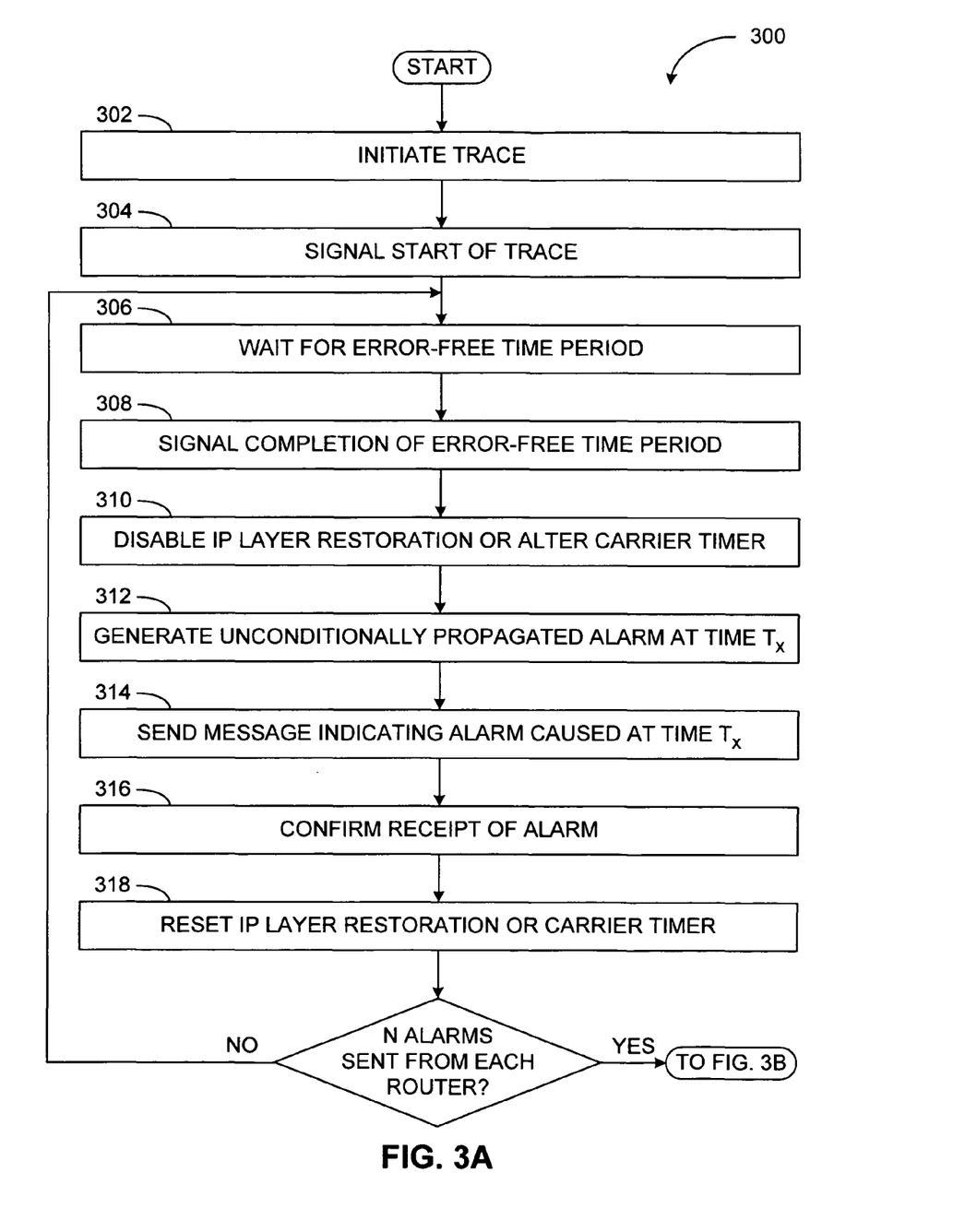
FIGS. 3A and 3B depict a flow chart of a specific method of tracing a communication route through an IP-over-optical network according to an embodiment of the invention.
Figure 3B:
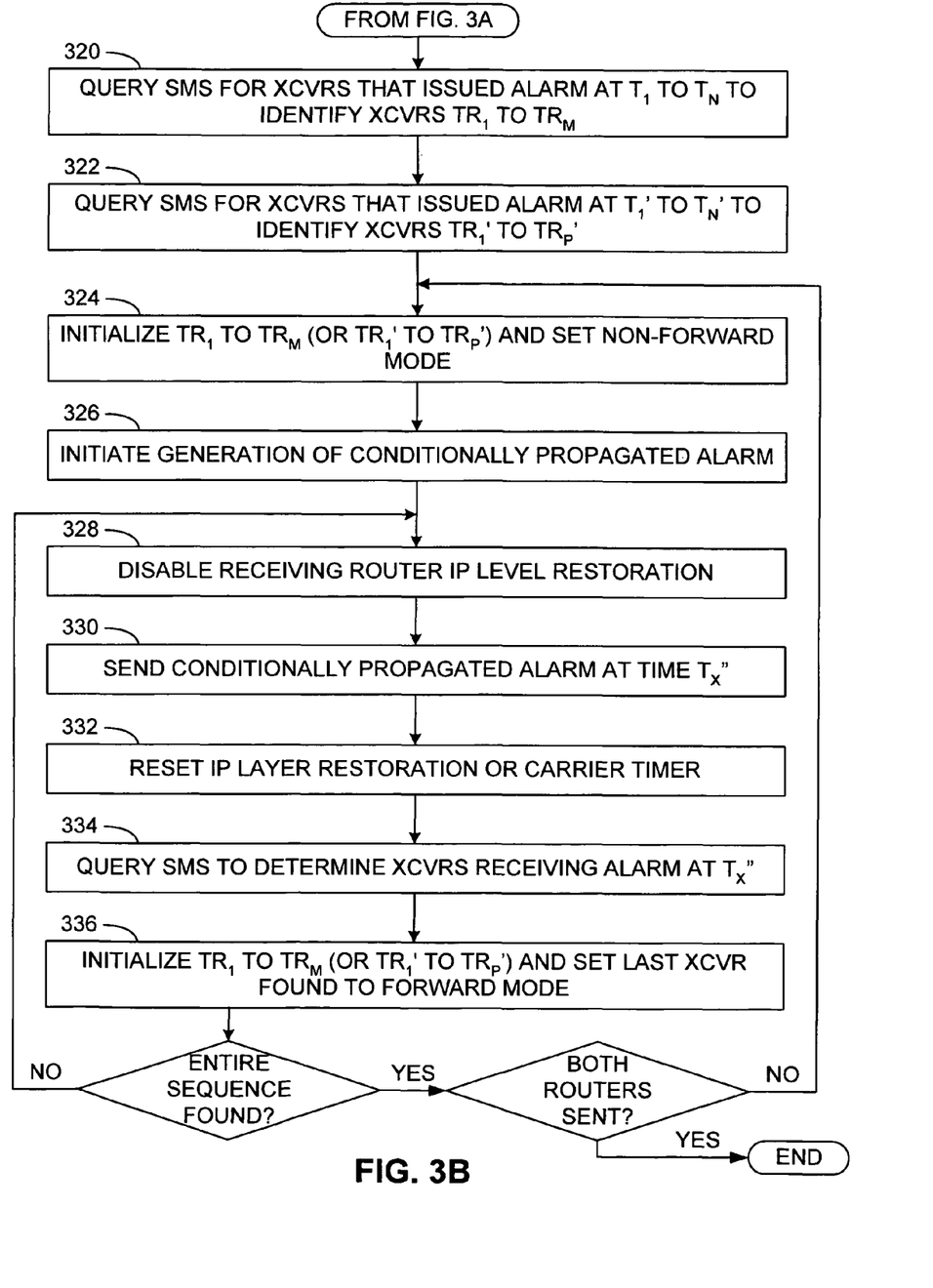

More specifically related to the particular link 100 of FIG. 1, FIGS. 3A and 3B illustrate a method 300 according to an embodiment of the invention for determining the route of data packets transferred between the first router 110a and the second router 110b by way of the WDM transceivers 138. In one embodiment, initiation of the various actions occurs by way of a remote terminal (not shown in FIG. 1) in communication with the routers 110 (operation 302). In addition, as described below, the remote terminal may access a network management system (NMS) (in this case, the SONET management system (SMS)) through one or more application programming interfaces (APIs), and thus may query the NMS regarding alarm conditions and the like reported by the WDM transceivers 138. Thus, by way of the remote terminal, a user or network manager may initiate an automatic tracing function to determine the route taken by data packets via the WDM transceivers 138 between the first and second routers 110.

Once trace routing is initiated, each of the routers 110 is notified to indicate that SONET-level errors are going to be generated by one router to be received by the other router (operation 304). In one embodiment, the remote terminal directly notifies both routers 110, indicating which will be generating the errors first. In another embodiment, the first router 110a may be notified by the remote terminal, after which the first router 110a notifies the second router 110b via the link 100.

Each of the routers 110 then waits for an error-free period of time exceeding the size of the error bins employed in SONET (operation 306). In one embodiment, each router 110 waits for a length of time exceeding fifteen minutes to ensure no naturally-produced errors (i.e., errors generated during normal data transfer operations) are encountered during the current error bin. If a naturally-produced error in a SONET frame is encountered in other traffic between the routers 110, the routers 110 wait another fifteen minutes until an error-free bin is encountered. The wait period helps isolate naturally-produced errors from the errors intentionally generated by the trace. Once such an error-free period occurs, each of the routers 110 signals the other over the link 100 to indicate detection of this period (operation 308).

Assuming an error-free time of fifteen minutes is encountered, each router 110 disables "IP layer restoration" (operation 310). IP level restoration describes the actions of the routers 110 to reconfigure the network topology at the IP level to circumvent the link 100 or portions thereof that are considered defective. Generally, such rerouting involves the modification of a routing table maintained by each router 110. These routing tables typically must be synchronized with each other to ensure effective routing. Generally, this synchronization is rather time-consuming, so the routers 110 typical wait for a relatively length period of time, such as 200 milliseconds, before attempting IP layer restoration. Allowing IP layer restoration would defeat the purpose of determining the current route between the routers 110, as that route would no longer be valid if errors transmitted during detection of the route caused the route to be deemed unusable. Thus, IP layer restoration is disabled to allow generation and transmission of SONET alarms without causing subsequent network rerouting.

In an alternative embodiment, each of the routers may alter the value of its "carrier timer," which typically is a configurable amount of time during which a router 110 will wait for the communication link 100 to recover before initiating IP layer restoration. In one embodiment, the carrier timer is set to a sufficiently high value to ensure that IP layer restoration, and hence rerouting, will not occur during the tracing of the route, as described below. In such a case, the optical network layer underlying the IP layer would then be primarily responsible for reestablishing communication in the presence of errors before the IP layer initiates restoration. In one embodiment, the carrier timer of each router 110 is set to five seconds.

One of the routers 110 (for example, the first router 110a) then generates an unconditionally propagated SONET alarm as a first signal to be detected by the other router 110 (operation 312). In other words, the first router 110a causes an alarm condition which will be propagated through all WDM transceivers 138 along the yet-to-be-traced route to the second router 110b regardless of how each WDM transceiver 138 is configured regarding the forwarding of alarm conditions. In one embodiment, the SONET alarm is a code violation (CV), which indicates a data error in the data packet being transferred from the first router 110a to the second router 110b. In one embodiment, the POS interface 120 of each router 110 is capable of generating burst data errors solely in the SONET overhead bytes in order to trigger CV alarms in the WDM transceivers 138 receiving the data without affecting the data at the IP level. For example, an integrated circuit within the POS interface 120, such as a PM5380 ATM and Packet Over SONET/SDH Physical Layer Device by PMC-Sierra, Inc., or the μPD98414 ATM SONET Framer by NEC Electronics, Inc., may be employed to generate code violations in the SONET frame bytes. For example, the B1 byte of the SONET section overhead, which carries the section bit-interleaved parity code (BIP-8) byte, may be corrupted to cause a parity error, and hence a code violation, in the receiving WDM transceiver 138. Other methods for generating a CV alarm, such as corrupting the B2 byte (i.e., the line bit-interleaved parity code (BIP-8) byte), the B3 byte (i.e., the synchronous transport signals (STS) path bit-interleaved parity code (path BIP-8) byte), and others, may be performed in the alternative. Generally, alteration is performed on the SONET frame itself rather than the IP packets carried inside the SONET frame due to the inability of most IP routers to generate errors, the inability of SONET framers to detect IP packet errors, and the relative ease with which various bytes of the SONET frame may be accessed and modified.

In one embodiment, the length of each burst error may range from one to some small number n so that the overall error rate remains below some error rate, such as $1 \times 10^{-9}$. The length of each burst error is reported in a CV alarm and is employed by the remote terminal to discern the CV alarms generated by the route tracing function from those which occur naturally, as is discussed further below. Thus, by keeping the length of each burst error low, and hence the overall error rate low, the ability of the remote terminal to distinguish between generated and normally-occurring errors is enhanced, thus improving the accuracy of the route tracing function. In another embodiment, if the communication link 100 historically exhibits a particular burst error length, a different burst error length may be employed for the generated errors to help distinguish between naturally-produced errors and those errors generated for the route-tracing function.

The first router 110a generates the first burst error or other alarm at a random time $T_1$. The first router 110a also sends a message to the second router 110b indicating the time value of $T_1$ so that the second router may distinguish the first burst error from other naturally-produced errors that may be occurring over the link 100 (operation 314). In an alternative embodiment, the length of the generated burst error may also be transferred so that the second router 110b may discern generated errors from natural errors. If the second router 110b detects the presence of the first burst error, the second router 110b records the time $T_1$ and signals the first router 110a to confirm that the first burst error was detected (operation 316). Both the first and the second routers 110a, 110b then reset their corresponding carrier timers, or re-enable IP layer restoration (operation 318), and return to waiting for a bin length of fifteen minutes of no errors during normal operation of the link 100 (operation 306). In an alternative embodiment, the disabling of IP layer restoration executed earlier (operation 310) is a timed operation which involves an automatic re-enabling of IP layer restoration capability after a specified amount of time. Therefore, a separate re-enabling operation (operation 318) would not be necessary in that particular case.

Execution follows in this fashion until a predetermined number N of confirmed random time stamps, $T_1$ through $T_N$, are collected by the second router 110b. In one embodiment, at least four time random time stamps are collected, which may require one to two hours to accomplish. In one embodiment, each of the random time stamps $T_1$ through $T_N$ are chosen so that the pattern, or "signature," of the time stamps is different than that produced by normal errors produced over the link 100. For example, a particular repeating pattern of low values for the length of each burst error, such as three followed by eight, may be employed to distinguish the generated errors from naturally-occurring errors. Thus, the remote terminal may use both the timestamp and the length of the burst error to detect the SONET alarms generated for route tracing purposes.

In conjunction with the burst errors generated by the first router 110a to the second router 110b, the second router 110b may also generate a second set of burst errors 110b to the first router 110a, resulting in a second set of time stamps $T_1'$ through $T_N'$ (operations 306-318). In an alternative embodiment, the number of time stamps generated by the first router 110a and the second router 110b may be different. In one embodiment, the second router 110b generates its burst errors to develop the second set of time stamps after the first set of time stamps $T_1$ through $T_N$ have been collected. In another embodiment, the first router 110a and the second router 110b generate burst errors concurrently so that the two sets of time stamps are also collected concurrently to reduce the amount of time required to collect the time stamps.

As a result of the burst errors generated by each of the routers 110a, 110b by way of their associated POS interfaces 120a, 120b, each WDM transceiver 138 constituting part of the route taken by the data packets between the first and second routers 110a, 110b detects the errors and reports them to the SMS. Each error report to the SMS also includes a time stamp indicating the time at which the burst error was detected, and the length of the particular burst error, as described above.

After collection of the two sets of time stamps, the remote terminal may then query the SMS to determine the identity of each WDM transceiver 138 that issued a CV alarm at each of the particular time stamps $T_1$ through $T_N$, thereby identifying a first set of WDM transceivers 138, referred to herein as $TR_1$ through $TR_M$, that may form the route through the link 100 from the first router 110a to the second router 110b (operation 320). The remote terminal also queries the SMS to identify each WDM transceiver 138 that issued a CV alarm at each of the second set of time stamps $T_1'$ through $T_N'$, thereby producing a second set of WDM transceivers 138, labeled herein as $TR_1'$ through $TR_P'$, that may form the route from the second router 110b to the first router 110a (operation 322). In one embodiment, the two sets of WDM transceivers 138 may not coincide (i.e., $TR_1$ through $TR_M$ are not the same as $TR_1'$ through $TR_P'$), thereby indicating that the path from the first router 110a to the second router 110b is different from the path from the second router 110b to the first router 110a.

While the WDM transceivers 138 employed within the link 100 for the route between the routers 110a, 110b have been identified at this point, the order or sequence of the WDM transceivers 138 along the route as they are encountered by data packets transferred between the routers 110a, 110b is yet to be determined. To address this need, the remote terminal employs the use of a conditionally propagated alarm as a second signal to determine the sequence. In one embodiment, the conditionally propagated alarm is the AIS alarm mentioned above.

More specifically, the remote terminal initializes the WDM transceivers $TR_1$-$TR_M$ by signaling each of the transceivers to clear its fifteen minute bin alarms and counters (operation 324). The remote terminal also informs each of the WDM transceivers $TR_1$-$TR_M$ in the path to prevent forwarding of AIS alarms received over the long reach interface 134 of each of the transceivers (operation 324). The remote terminal also signals the first and second routers 110a, 110b to begin the process of sending and receiving messages incorporating MS alarms (operation 326). In one embodiment, the remote terminal also informs the routers 110a, 110b which of the two will be sending the alarms. In an alternative embodiment, the sending router (for example, the first router 110a) informs the receiving router (the second router 110b) by way of a message that the transmission of AIS alarms will begin.

Prior to the sending of the AIS alarms, the first router 110a and the second router 110b each disables its IP layer restoration capability, or modifies its carrier timer to a level sufficiently high to prevent the routers 110a, 110b from attempting to invoke their IP layer restoration capability while the AIS alarms are being transmitted (operation 328). In so doing, the routers 110a, 110b substantially limit their capacity to reconfigure the route connecting the routers 110a, 110b, as discussed above.

Figure 4A:
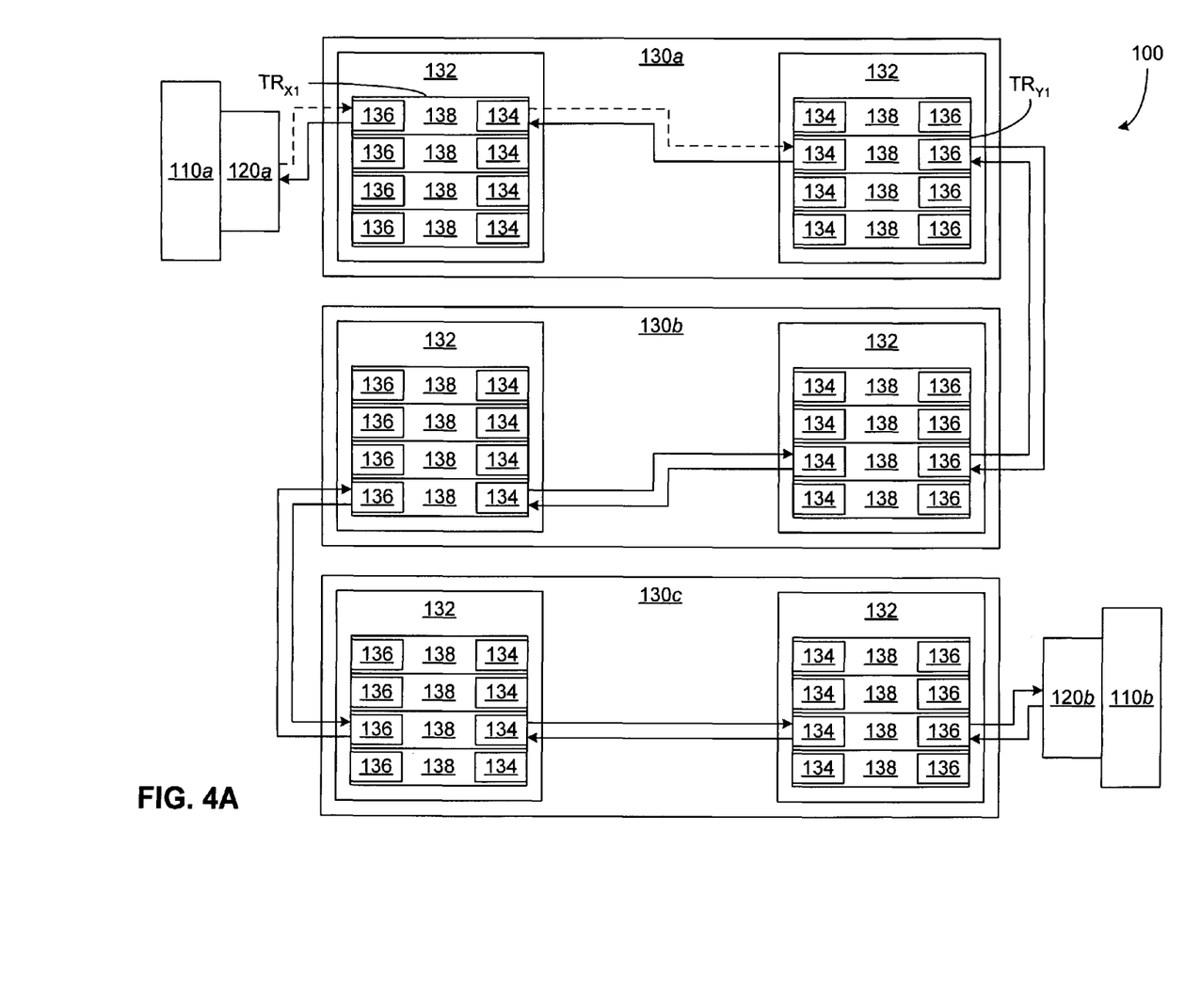
FIGS. 4A and 4B are block diagrams depicting the propagation of a conditionally propagated alarm along a route of a communication network under two different scenarios according to an embodiment of the invention.

The first router 110a then sends an AIS alarm in a message to the second router 110b at a random time $T_1''$ (operation 330). FIG. 4A depicts the extent which the MS alarm propagates along the link 100 by way of dashed arrows. Given that each of the identified WDM transceivers $TR_1$ through $TR_M$ have been configured to not propagate an AIS alarm received over its long reach interface 134, an AIS alarm will propagate through a first WDM transceiver $TR_{X1}$ encountered, which is directly coupled with the first router 110a, by way of the short reach interface 136 of the first transceiver $TR_{X1}$. Accordingly, the first transceiver $TR_{X1}$ resides on the WDM terminal 132 of the WDM system 130*a* first encountered along the route from the first router 110*a* to the second router 110*b*. The AIS alarm is propagated to a second WDM transceiver $TR_{Y1}$ by way of the long reach interface 134 of the first and second transceivers $TR_{X1}$, $TR_{Y1}$. The second transceiver $TR_{Y1}$ thus resides within the second WDM terminal 132 of the first WDM system 130*a*. As the second transceiver $TR_{Y1}$ received the current message over its long reach interface 134, the second transceiver $TR_{Y1}$ does not propagate the AIS alarm when it transfers the current message over its short reach interface 136 to the next WDM transceiver, thus ceasing any further propagation of that alarm. Therefore, only the first two WDM transceivers $TR_{X1}$, $TR_{Y1}$ have detected the AIS alarm, and have subsequently reported the alarm to the SMS. The message from the first router 110*a* then continues on to the second router 110*b* along the link 100, but without the AIS alarm signal. In the report to the SMS, each transceiver $TR_{X1}$, $TR_{Y1}$ typically reports the time the AIS alarm was received, which in this example is the time stamp $T_1''$. In addition, each transceiver $TR_{X1}$, $TR_{Y1}$ indicates in the report whether the AIS alarm was received over its short reach interface 136 or its long reach interface 134.

In one embodiment, the IP layer restoration or carrier timer is then restored in the routers 110*a*, 110*b* to return the routers 110*a*, 110*b* to their normal operating state (operation 332).

The remote terminal then queries the SMS for each of the identified transceivers $TR_1$-$TR_M$ to determine the identity of the two transceivers $TR_{X1}$, $TR_{Y1}$ that reported the AIS alarm at the time stamp $T_1''$ (operation 334). The remote terminal determines which of the two transceivers $TR_{X1}$, $TR_{Y1}$ first received the AIS alarm by consulting the report to the SMS to determine whether the short reach interface 136 or the long reach interface 134 of each of the transceivers $TR_{X1}$, $TR_{Y1}$ received the alarm. Based on this information, the remote terminal can determine that the first transceiver $TR_{X1}$, having received the alarm over its short reach interface 136, was the first in the sequence of WDM transceivers $TR_1$-$TR_M$ to received the alarm, while the second transceiver $TR_{Y1}$, having received the alarm, from the first transceiver $TR_{X1}$ over its long reach interface 136, was the second transceiver in the sequence. Thus, the remote terminal is able to determine the first two transceivers $TR_{X1}$, $TR_{Y1}$ in the route from the first router 110*a* to the second router 110*b*.

The remote terminal then clears the fifteen minute bin alarms and counters for each of the identified WDM transceivers $TR_1$-$TR_M$ (operation 336). Further, the remote terminal sets the long reach interface 134 of the second transceiver $TR_{Y1}$ into AIS forwarding mode (operation 336).

Figure 4B:
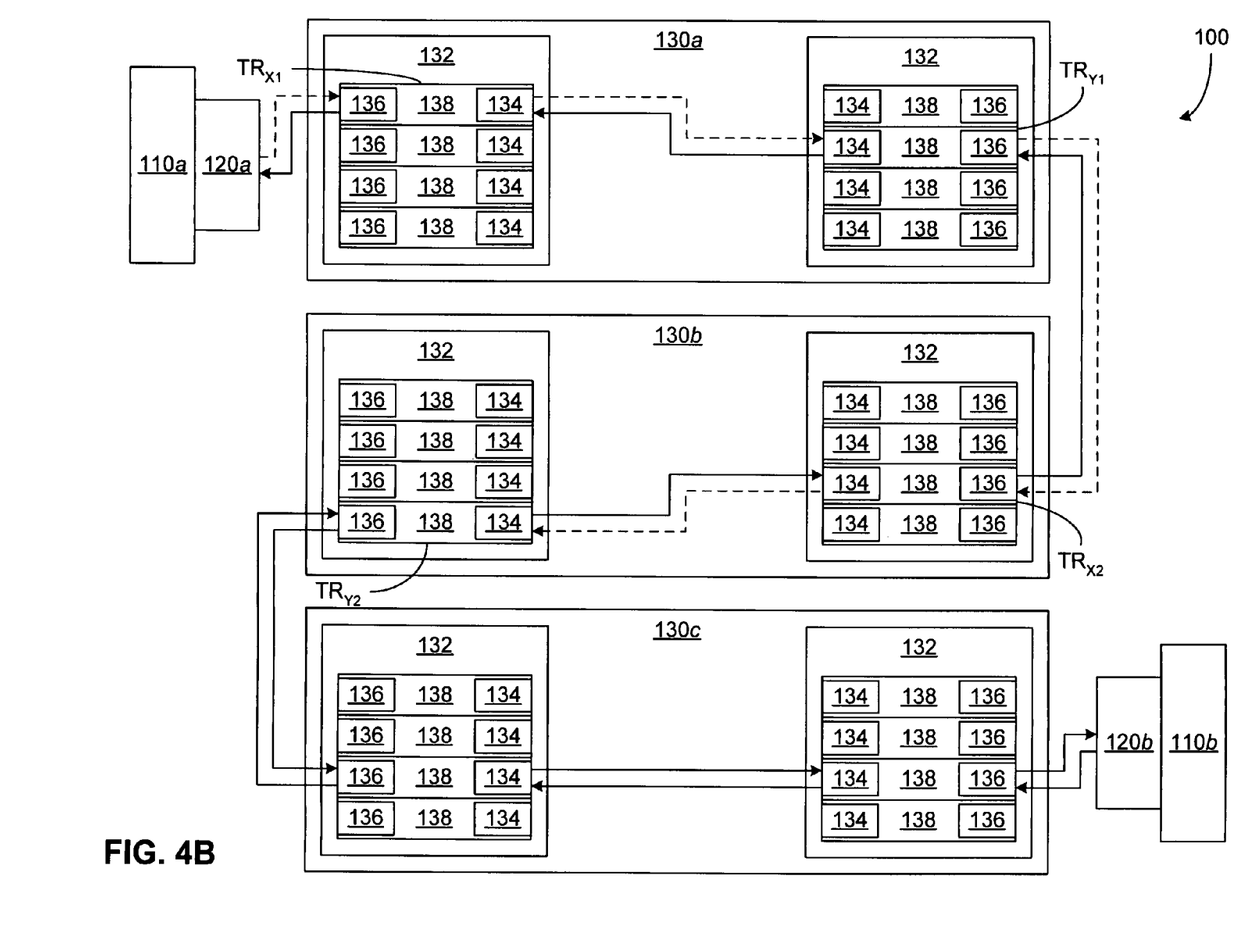

Prior to the sending another AIS alarm, the first router 110*a* and the second router 110*b* again disable their IP layer restoration capability, or modify their carrier timers as before (operation 328). The first router 110*a* is then free to generate another AIS alarm in a second message sent to the second router 110*b* at a second time $T_2''$ (operation 330). Since the second transceiver $TR_{Y1}$ is now configured to propagate the AIS alarm to the next transceiver along the route, the AIS alarm is now received by the first and second transceivers $TR_{X1}$, $TR_{Y1}$, and thereafter by a second pair of transceivers $TR_{X2}$, $TR_{Y2}$, residing within opposing WDM terminals 132 of the second WDM system 130*b*. This scenario is illustrated in FIG. 4B. As the fourth transceiver $TR_{Y2}$ is still configured to prevent propagation of an AIS alarm received over its long reach interface 134, the message from the first router 110*a* is passed along the remainder of the route toward the second router 110*b* without the AIS alarm. Thus, the second AIS alarm is received by each of the first four transceivers $TR_{X1}$, $TR_{Y1}$, $TR_{X2}$, $TR_{Y2}$, in the route, each of which reports the alarm to the SMS, including the information described above.

The IP layer restoration or carrier timer is then restored again in the routers 110*a*, 110*b* to return the routers 110*a*, 110*b* to their normal operating state (operation 332). The remote terminal then once again queries the SMS to determine which of the identified transceivers $TR_1$-$TR_M$ received the alarm (operation 334). Having already determined the sequence along the route of the first two transceivers $TR_{X1}$, $TR_{Y1}$, the remote terminal identifies the second pair of transceivers $TR_{X2}$, $TR_{Y2}$ as the next two transceivers in the route. Further, by determining which of the second pair of transceivers $TR_{X2}$, $TR_{Y2}$ received the message containing the AIS alarm over its short reach interface 136 or its long reach interface 134, the remote terminal can determine the proper order of the second pair of transceivers. In other words, since the third WDM transceiver $TR_{X2}$ received the message via its short reach interface 136, and the fourth transceiver $TR_{Y2}$ received the message by way of its long reach interface 124 (from the third transceiver $TR_{X2}$), the remote terminal ascertains the proper order of the third and fourth transceivers $TR_{X2}$, $TR_{Y2}$.

At this point, the remote terminal again clears the fifteen minute bin alarms and counters for each of the identified WDM transceivers $TR_1$-$TR_M$ (operation 336). Further, the remote terminal sets the long reach interface 134 of the fourth WDM transceiver $TR_{Y2}$ to AIS forwarding mode so that the AIS alarm may propagate beyond the fourth transceiver $TR_{Y2}$ to determine the next two WDM transceivers in the route (operation 336).

This process continues in this fashion, with another message containing an AIS alarm being sent from the first IP router 110*a* to the second router 110*b*, followed by a query of the SMS by the remote terminal to determine the next two transceivers in the route. In another embodiment, fewer or greater numbers of transceivers may be sequenced for each AIS alarm transferred. Once the remote terminal determines that no new WDM transceivers $TR_1$-$TR_M$ are being detected by way of another AIS alarm message, the proper sequence of the identified WDM transceivers $TR_1$-$TR_M$ along the route from the first router 110*a* to the second router 110*b* has been determined. In an alternative embodiment, once the sequence of each of the previously identified WDM transceivers $TR_1$-$TR_M$ has been discovered, the process of tracing the route may be considered completed.

Presuming the route for data packets transmitted from the first router 110*a* to the second router 110*b* follows the reverse sequence of WDM transceivers $TR_1$-$TR_M$ employed by messages sent from the second router 110*b* to the first router 110*a*, the process may end there. However, if the link 100 may be configured so that the two routes may be different, or if the results of the AIS alarms sent by the first router 110*a* should be verified, the same process may then occur as described above, with the second router 110*b* sending the AIS alarm messages to the first router 110*a*.

Therefore, methods according to an embodiment of the invention utilize a first alarm or signal indication sent from one router 110 to another router 110 to identify the transceivers employed in the data packet route in the link 100 between the first and second routers 110. Further, the actual sequence of the identified transceivers in the route is determined by the use of a second alarm or signal indication sent from one router 110 toward the other router 110.

Use of the various embodiments of the invention may be useful in tracing a route of a multi-layer network even in less-than-ideal conditions. Using the link 100 of FIG. 1 as an example, in cases where the link 100 between the first and second routers 110a, 110b is severed (e.g., when one of the WDM transceivers 138 carrying data packets between the routers 110a, 110b is inoperative), determination of the identity and sequence of the transceivers 138 constituting the route between one of the routers 110a, 110b and the point at which the route is broken may still be performed with some minor modifications to the method of tracing the route, as provided above. For example, as the packets containing burst data errors are not traversing the entire link 100 under these conditions, the receiving router 110 would not be required to confirm receipt of the burst error conditions generated by the sending router 110. Beneficially, as the route may be traced up to the point of a break in the link 100, performing the trace from each of the routers 110a, 110b may help localize, or even specifically identify, the location of the fault causing the link 100 to be inoperative.

Another difficulty may be the presence of an inordinate data error rate while a trace is being performed. Once again using the environment shown in FIG. 1, CV alarms may occur more often than once every fifteen minutes, thus not allowing an alarm bin that is free from naturally-occurring burst errors. As a result, eliminating the requirement of a CV alarm-free period of fifteen minutes prior to the sending router 110 issuing a packet with a CV alarm condition may be necessary in order to perform the trace. This condition likely makes positive detection of the CV errors purposely produced from the sending router 110 at a particular time stamp by the WDM transceivers 138 and the receiving router 110 more difficult and error-prone, as complete correlation of each transceiver reporting a CV error to the time stamp signature chosen by the sending router 110 may be improbable. While such conditions may render the tracing of the route less accurate, the multi-layer tracing methods disclosed herein produce useful tracing information in spite of the presence of a higher-than-normal data error rate. In an alternative embodiment, another unconditionally propagated alarm that is not affected by a high data error rate may be employed.

The embodiments of the invention disclosed above employ well-known alarm signals and frame bytes currently defined within the SONET standard, and thus may be employed to trace a wide range of multi-layer network links. Other methods residing within the scope of the invention may also be devised which employ less standard techniques. For example, within the context of the IP-over-SONET-over-WDM link described above, the AIS alarm may be replaced with another alarm signal that is conditionally propagated along the route being traced. Additionally, any SONET frame bytes that are currently unused or defined may be employed to pass along a special-purpose alarm signal detectable by each of the transceivers 138 along the route being traced. Similarly, the CV alarm may be replaced with any other alarm or error condition that is propagated unconditionally throughout each transceiver 138 along the path from the sending router 110 to the receiving router 110. For example, if the CV alarm is replaced in the tracing method with an alarm not associated with data errors, the fifteen minute wait between error bursts may be dispensed with, thereby shortening the overall time required to perform a trace.

In the case of either the unconditionally or conditionally propagated alarms, use of distinct alarms not associated with alarms or errors occurring during normal operation of the multi-layer network would also provide the additional advantage of the remote terminal being relieved of the responsibility of discerning alarms associated with normal operation from those generated during the trace. In addition, the use of a numerical identifier, in addition to the aforementioned time stamp, may be employed in conjunction with the alarm to provide another means of identifying the alarm as one employed by the route tracing function. That identifier may just be some random number, or an encrypted value providing some measure of security in identifying the source of the particular alarm. However, additional specialized software or firmware would likely be required in each of the routers 110 and the WDM transceivers 138 in order to interpret, propagate, and report each of the specialized alarms correctly.

While several embodiments of the invention have been discussed herein, other embodiments encompassed within the scope of the invention are possible. For example, while the specific environment discussed herein in conjunction with the various tracing methods discussed above is an IP-over-SONET-over-WDM multi-layer network, other multi-layer networks involving optical technology, such as IP-over-SONET-over-DWDM (dense wavelength division multiplexing), or IP-over-ATM (Asynchronous Transfer Mode)-over-SONET-over-WDM, may be traced in a similar fashion. Further, routes of other networks not employing an optical communication layer may also be traced using the principles discussed herein. Also, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. A method for tracing a communication route through an optical communication network coupling a first Internet protocol (IP) router with a second IP router, the method comprising:

at a first time, propagating an unconditionally propagated burst data error from the first IP router to the second IP router over the optical communication network to cause a plurality of intermediate optical transceivers of the optical communication network to report first information concerning the unconditionally propagated burst data error, wherein the first information indicates which of the intermediate optical transceivers detected the unconditionally propagated burst data error and times of detection of the unconditionally propagated burst data error at each of the intermediate optical transceivers;

in a remote terminal, receiving the first information and processing the first information to correlate the first time to the times of detection to identify the intermediate optical transceivers that are within the communication route coupling the first IP router with the second IP router;

configuring a selected subset of the intermediate optical transceivers so that a conditionally propagated alarm condition, when propagated from the first IP router toward the second IP router, causes the selected subset of the intermediate optical transceivers to report second information concerning the conditionally propagated alarm condition, wherein the second information indicates which of the intermediate optical transceivers propagated the conditionally propagated alarm condition;

propagating the conditionally propagated alarm condition from the first IP router toward the second IP router;

in the remote terminal, receiving the second information and processing the second information to identify a sequence of the selected subset within the intermediate optical transceivers; and repeatedly re-configuring further selected subsets of the intermediate optical transceivers, re-propagating the conditionally propagated alarm condition from the first IP router toward the second IP router, and re-processing the second information of the further selected subsets in the remote terminal until an entire sequence of the intermediate optical transceivers defining the communication route is determined.

2. The method of claim 1, wherein the unconditionally propagated burst data error triggers a Synchronous Optical Network code violation (CV) alarm in each of the plurality of intermediate optical transceivers.

3. The method of claim 2, further comprising re-propagating further unconditionally propagated burst data errors to trigger the Synchronous Optical Network code violation alarms a predetermined number of times at random times to represent an error signature differing from that identified with code violations occurring during normal network operation.

4. The method of claim 3, wherein the further unconditionally propagated burst data errors which trigger the Synchronous Optical Network code violation alarms each comprises a numeric identifier employed as part of the error signature.

5. The method of claim 2, further comprising waiting for a predetermined period of time during which no code violations occur before propagating the unconditionally propagated burst data error.

6. The method of claim 1, wherein the conditionally propagated alarm condition comprises a Synchronous Optical Network alarm indicating signal (AIS).

7. The method of claim 1, further comprising modifying an IP-layer restoration configuration of the first IP router prior to propagating the unconditionally propagated burst data error and returning the IP-layer restoration configuration of the first IP router to an unmodified state after propagation of the unconditionally propagated burst data error.

8. The method of claim 1, further comprising modifying an IP-layer restoration configuration of the first IP router prior to propagating or re-propagating the conditionally propagated alarm condition and returning the IP-layer restoration configuration of the first IP router to the unmodified state after propagation or re-propagating of the conditionally propagated alarm condition.

9. The method of claim 7, wherein modifying the IP-layer restoration configuration of the first IP router comprises altering a carrier timer of the first IP router prior to propagating the unconditionally propagated burst data error.

10. The method of claim 8, wherein modifying the IP-layer restoration configuration of the first IP router comprises altering a carrier timer of the first IP router prior to propagating or re-propagating the conditionally propagated alarm condition.

11. A non-transitory digital storage medium for storing a program comprising instructions executable on a processor for implementing a method for tracing a communication route through an optical communication network coupling a first Internet protocol (IP) router with a second IP router, the method comprising:
at a first time, propagating an unconditionally propagated burst data error from the first IP router to the second IP router over the optical communication network to cause a plurality of intermediate optical transceivers of the optical communication network to report first information concerning the unconditionally propagated burst data error, wherein the first information indicates which of the intermediate optical transceivers detected the unconditionally propagated burst data error and times of detection of the unconditionally propagated burst data error at each of the intermediate optical transceivers;
in a remote terminal, receiving the first information and processing the first information to correlate the first time to the times of detection to identify the intermediate optical transceivers that are within the communication route coupling the first IP router with the second IP router;
configuring a selected subset of the intermediate optical transceivers so that a conditionally propagated alarm condition, when propagated from the first IP router toward the second IP router, causes the selected subset of the intermediate optical transceivers to report second information concerning the conditionally propagated alarm condition, wherein the second information indicates which of the intermediate optical transceivers propagated the conditionally propagated alarm condition;
propagating the conditionally propagated alarm condition from the first IP router toward the second IP router;
in the remote terminal, receiving the second information and processing the second information to identify a sequence of the selected subset within the intermediate optical transceivers; and
repeatedly re-configuring further selected subsets of the intermediate optical transceivers, re-propagating the conditionally propagated alarm condition from the first IP router toward the second IP router, and re-processing the second information of the further selected subsets in the remote terminal until an entire sequence of the intermediate optical transceivers defining the communication route is determined.

12. The non-transitory digital storage medium of claim 11, wherein the unconditionally propagated burst data error triggers a Synchronous Optical Network code violation (CV) alarm in each of the plurality of intermediate optical transceivers.

13. The non-transitory digital storage medium of claim 12, the method further comprising re-propagating further unconditionally propagated burst data errors to trigger the Synchronous Optical Network code violation alarms a predetermined number of times at random times to represent an error signature differing from that identified with code violations occurring during normal network operation.

14. The non-transitory digital storage medium of claim 13, wherein the further unconditionally propagated burst data errors which trigger the Synchronous Optical Network code violation alarms each comprises a numeric identifier employed as part of the error signature.

15. The non-transitory digital storage medium of claim 12, the method further comprising waiting for a predetermined period of time during which no code violations occur before propagating the unconditionally propagated burst data error.

16. The non-transitory digital storage medium of claim 11, wherein the conditionally propagated alarm condition comprises a Synchronous Optical Network alarm indicating signal (AIS).

17. The non-transitory digital storage medium of claim 11, the method further comprising modifying an IP-layer restoration configuration of the first IP router prior to propagating the unconditionally propagated burst data error and returning the IP-layer restoration configuration of the first IP router to an unmodified state after propagation of the unconditionally propagated burst data error.

18. The non-transitory digital storage medium of claim 11, the method further comprising modifying an IP-layer restoration configuration of the first IP router prior to propagating or re-propagating the conditionally propagated alarm condition and returning the IP-layer restoration configuration of the first IP router to the unmodified state after propagation or re-propagating of the conditionally propagated alarm condition.

19. The non-transitory digital storage medium of claim 17, wherein modifying the IP-layer restoration configuration of the first IP router comprises altering a carrier timer of the first IP router prior to propagating or the unconditionally propagated burst data error.

20. The non-transitory digital storage medium of claim 18, wherein modifying the IP-layer restoration configuration of the first IP router comprises altering a carrier timer of the first IP router prior to propagating or re-propagating the conditionally propagated alarm condition.

* * * * *